Feb. 19, 1957   G. F. YEAGER   2,782,021
ARTICULATING CONNECTORS FOR WEIGHING SCALES
Filed Feb. 11, 1954   2 Sheets-Sheet 1
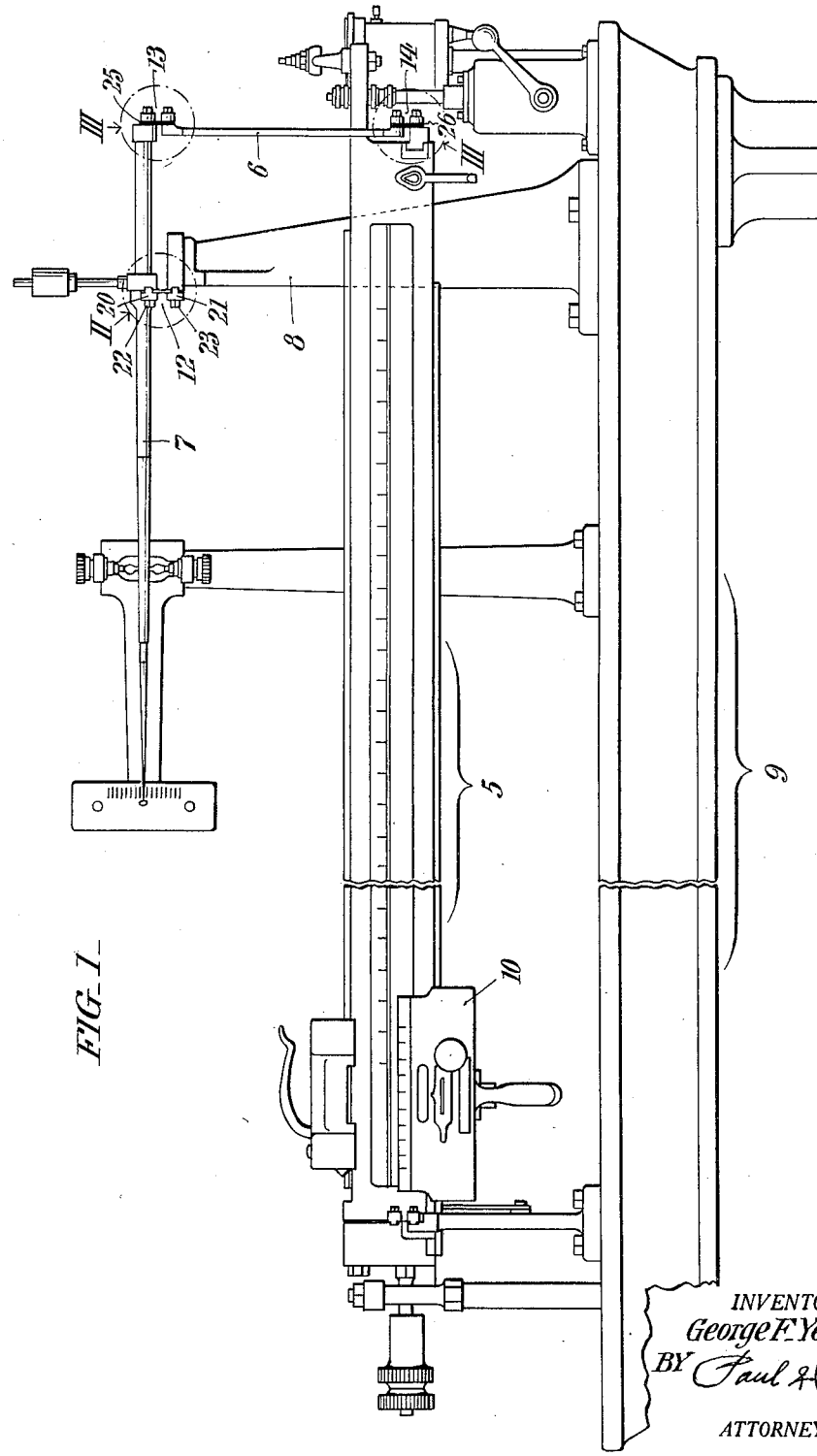

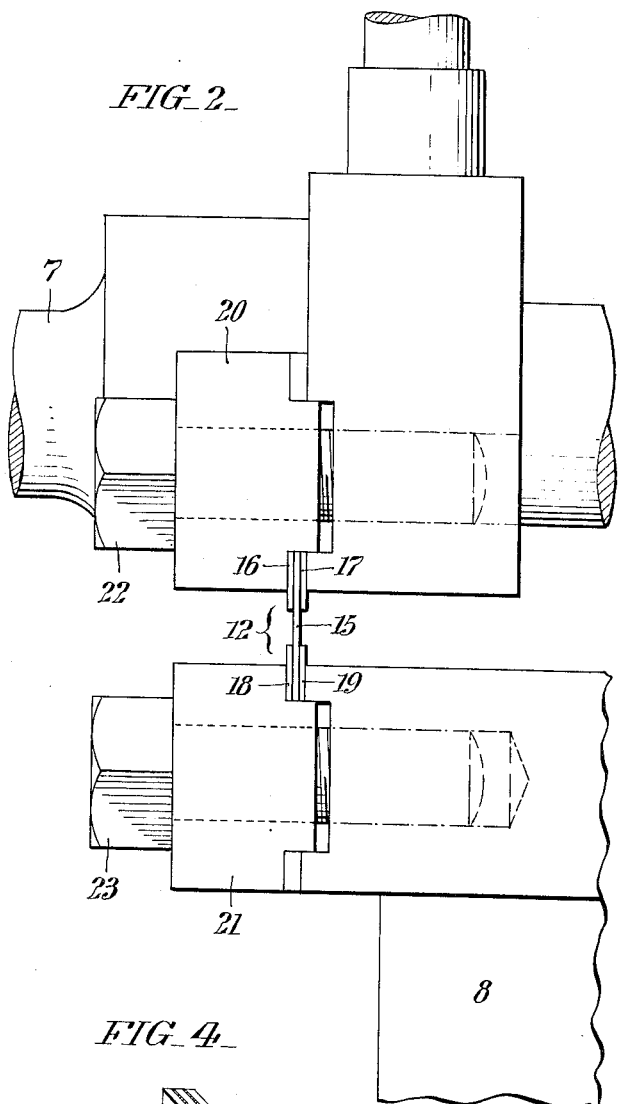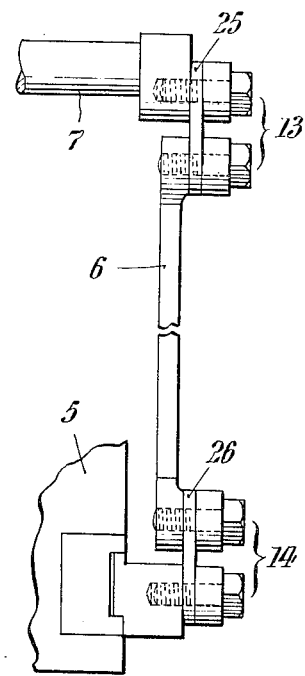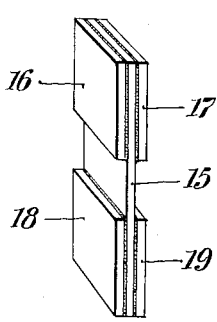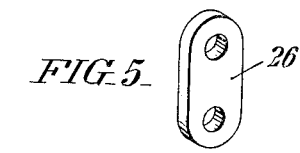
FIG_2_
FIG_3_
FIG_4_
FIG_5_
INVENTOR:
George F. Yeager,
BY Paul & Paul
ATTORNEYS.

United States Patent Office 2,782,021
Patented Feb. 19, 1957

2,782,021
ARTICULATING CONNECTORS FOR WEIGHING SCALES

George F. Yeager, Altoona, Pa.

Application February 11, 1954, Serial No. 409,697

3 Claims. (Cl. 265—58)

This invention relates to articulating connectors for weighing scales particularly for scales of the beam type such as are used in weighing heavy objects like trucks, locomotives, railway cars, etc.

In scales of the kind referred to, as ordinarily constructed heretofore, the moving parts, i. e., the indicator arms, the beams, and the interposed links or yokes are interconnected by short single ply lengths of hardened flexible spring strip metal. Due to sharp bending of these strip connectors adjacent the clamps by which their ends are secured to the interconnected parts and to attendant fatigue of the metal, these strips fracture frequently during operation of the scales, thereby rendering the scales useless until costly and time consuming repairs could be made.

The chief aim of my invention is to overcome aforementioned drawbacks. This objective is realized in practice, as hereinafter more fully disclosed, by reinforcing the articulating strip connectors adjacent the end securing means in such a way as to preclude sharp bending thereof at said regions and so minimize fatigue of the metal and prevent its fracture.

Other objects and attendant advantages will appear from the following detailed description of the attached drawings, wherein:

Fig. 1 is a fragmentary view, in side elevation, of a weighing scale conveniently embodying my invention.

Figs. 2 and 3 are fragmentary views on a larger scale showing the construction at the locations II and III in Fig. 1.

Fig. 4 is a perspective view of one of my improved articulating connectors; and

Fig. 5 is a view similar to Fig. 4 showing an alternative form of connector.

The scale herein illustrated by way of example is generally of well known construction in that it has a horizontally-arranged weigh beam 5 whereof one end is coupled, through a vertical link or yoke 6, with the corresponding end of an indicator arm 7 which is fulcrumed on the top of a standard 8 rising from a beam shelf 9. The indicator arm 7 operates as an amplifier of the movement of the beam 5, during adjustment of the poise at 10, to balance the weight on the scale in the usual well known manner, oscillatory movement occurring at the fulcrum joint between said arm and the standard 8, and also at the joints 13 and 14 of the link 6 with said indicator arm and said beam respectively.

In accordance with my invention, the articulating element or connector 12 between the indicator arm 7 and the standard 8, instead of being formed simply of a single piece of ribbon steel as ordinarily, is of laminated construction, that is to say, comprises (see Figs. 2 and 4) a main strip component 15 of very thin flexible spring ribbon steel, and reinforcing laminae 16, 17 and 18, 19 of like material but of less than half the length of said strip. As shown in Fig. 4, these reinforcing laminae 16, 17 and 18, 19 flank opposite end portions of the strip 15 to which latter they are preferably cemented as conventionally indicated in Fig. 4 for temporary maintenance in assembly during installation. The opposite ends of element 12 are secured respectively to the indicator arm 7 medially of the ends of the latter and to the fulcrum support 8 at the top as ordinarily by means of clamp blocks 20 and 21 which are arranged to be drawn up tightly by means of cap screws 22 and 23 respectively. It is to be particularly noted that the flanking components 16, 17 and 18, 19 lap the central or main strip 15 of the element 12 by a substantial distance beyond the clamps 20 and 21. Thus, it will be seen that, in the operation of the scale, the free end portions of the laminae 16, 17 and 18, 19 will flex with the central component 15 and avoid sharp bending of the latter at the edge regions of the clamps 20 and 21. As a consequence, the life of the connector is enhanced and frequent break downs of the scale are thereby definitely precluded.

At the joints 13 and 14, I provide non-metallic articulating connector elements 25 and 26 of rubber or fabric (one of these being separately illustrated in Fig. 5) which are advantageous in that they are more flexible and allow easier movements to take place between the beam 5, the link 6 and the indicator arm 5, in addition to having great longevity, the opposite ends of the element 25 being secured respectively to a clamp at one end of the indicator arm and a clamp at the upper end of the link 6, and the opposite ends of the element 26 being secured in clamps respectively at the lower end of said link and at the contiguous end of the weigh beam. However, it is to be understood that, if desired, connectors of the first described form may be used in lieu of the connectors 26 at the regions 13 and 14.

Having thus described my invention, I claim:

1. In a weighing scale having a horizontally-arranged weigh beam, a horizontally-arranged indicator arm above the weigh beam provided intermediate its ends with a clamp, a fulcrum standard for the indicator arm provided at the top with a similar clamp, and means operatively connecting one end of the indicator arm to the corresponding end of the weigh beam, an articulating element comprising a short strip of very thin flexible ribbon steel and laminae of like material flanking opposite end portions of the strip, the opposite end portions of said element being secured respectively within the clamps of the indicator arm and of the fulcrum standard, and the laminae lapping the strip to a substantial distance beyond the respective clamps to prevent sharp bending of the strip immediately at the clamps during operation of the scale.

2. The invention according to claim 1, wherein the flanking components of the articulating connection are cemented to the main or central component for temporary maintenance in assembly during installation.

3. In a weighing scale having a horizontally-arranged weigh beam with a clamp at one end thereof, a horizontally-arranged indicator arm above the weigh beam provided with clamps respectively at an intermediate point and at one end, a fulcrum standard for the indicator arm provided at the top with a similar clamp, an operating connection between the weigh beam and the pointer arm including a rigid link with clamps respectively at opposite ends thereof, and articulating elements in the form of relatively short strips of flexible non-metallic material, such element having its opposite ends secured respectively in the endmost clamp of the indicator arm and in the clamp at one end of the link, and the other such element having its opposite ends secured respectively in the clamp on the weigh beam and the clamp at the other end of the link; and an articulating element comprising a short strip of very thin flexible ribbon steel with laminae of the like material flanking opposite end portions thereof, the opposite end portions of said element being secured respectively within the medial clamp of the indicator arm and the clamp at the top of the fulcrum standard, and said laminae lapping the strip to a substantial distance beyond the respective clamps last mentioned to prevent bending of the strip immediately at said clamps during operation of the scale.

References Cited in the file of this patent

UNITED STATES PATENTS

| | | |
|---|---|---|
| 849,418 | Nickerson | Apr. 9, 1907 |
| 2,009,020 | Flanagan | June 23, 1935 |
| 2,142,424 | Triner | Jan. 3, 1939 |
| 2,552,319 | Hess | May 8, 1951 |
| 2,584,950 | Weckerly | Feb. 5, 1952 |
| 2,634,966 | Williams | Apr. 14, 1953 |

FOREIGN PATENTS

| | | |
|---|---|---|
| 143,101 | Australia | Apr. 20, 1950 |